US009328181B2

(12) United States Patent
Albunia et al.

(10) Patent No.: US 9,328,181 B2
(45) Date of Patent: May 3, 2016

(54) DISORDERED NANOPOROUS CRYSTALLINE FORM OF SYNDIOTACTIC POLYSTYRENE, PROCESS FOR ITS PREPARATION AND ARTICLES COMPRISING THE SAME

(75) Inventors: Alexandra Romina Albunia, Battipaglia (IT); Riccardo Bianchi, Naples (IT); Luciano Di Maio, Cava De Tirreni (IT); Maurizio Galimberti, Milan (IT); Gaetano Guerra, Salerno (IT); Roberto Pantani, Salerno (IT); Stanislao Senatore, Piano di Sorrento (IT)

(73) Assignee: Nano Active Film S.R.L., Fisciano (IT)

( * ) Notice: Subject to any disclaimer, the term of this patent is extended or adjusted under 35 U.S.C. 154(b) by 0 days.

(21) Appl. No.: 13/977,167

(22) PCT Filed: Dec. 29, 2011

(86) PCT No.: PCT/EP2011/074227
§ 371 (c)(1),
(2), (4) Date: Jun. 28, 2013

(87) PCT Pub. No.: WO2012/089805
PCT Pub. Date: Jul. 5, 2012

(65) Prior Publication Data
US 2013/0280534 A1    Oct. 24, 2013

(30) Foreign Application Priority Data
Dec. 30, 2010   (IT) .............................. MI2010A2460

(51) Int. Cl.
| | | |
|---|---|---|
| *C08F 112/08* | (2006.01) | |
| *C09D 125/06* | (2006.01) | |
| *C08J 5/18* | (2006.01) | |
| *C08J 7/02* | (2006.01) | |
| *C08J 7/04* | (2006.01) | |
| *C08J 9/28* | (2006.01) | |
| *D01F 6/22* | (2006.01) | |

(52) U.S. Cl.
CPC ................ *C08F 112/08* (2013.01); *C08J 5/18* (2013.01); *C08J 7/02* (2013.01); *C08J 7/047* (2013.01); *C08J 9/28* (2013.01); *C09D 125/06* (2013.01); *D01F 6/22* (2013.01); *C08J 2323/12* (2013.01); *C08J 2325/06* (2013.01); *C08J 2425/06* (2013.01); *C08J 2433/06* (2013.01); *Y10T 428/2982* (2015.01)

(58) Field of Classification Search
None
See application file for complete search history.

(56) References Cited

U.S. PATENT DOCUMENTS 5,171,834 A * 12/1992 Funaki .......................... 528/493
6,326,072 B1 * 12/2001 Ojeda et al. .................. 428/40.1

FOREIGN PATENT DOCUMENTS

WO   WO 2004045585 A1 *  6/2004
WO   WO-2008/023331 A2    2/2008

OTHER PUBLICATIONS

Rizzo et al., "Thermal transitions of epsilon crystalline phases of syndiotactic polystyrene", Macromolecules, 2007, 40, 9470-9474.
(Continued)

*Primary Examiner* — Alexandre Ferre
(74) *Attorney, Agent, or Firm* — Polsinelli PC

(57) ABSTRACT

There is described a new disordered nanoporous crystalline form of syndiotactic polystyrene, characterized by a specific X-ray diffractogram, the process for its preparation and various articles comprising this form of s-PS. This disordered nanoporous crystalline form exhibits empty crystalline cavities of nanometric sizes, and in this case performs the function of absorbing molecules with low molecular mass and is useful in particular as functionally active packaging for plant products.

27 Claims, 10 Drawing Sheets

(56) References Cited

OTHER PUBLICATIONS

Rizzo et al., "Crystalline orientation in syndiotactic polystyrene cast films", Macromolecules, 2002, 35, 5854-5860.

Daniel et al., "Crystallization from the amorphous form of the nanoporous epsilon form of syndiotactic polystyrene," Polymer, 2010, 51, 4599-4605.

Gowd et al., "Structural phase transmissions of syndiotactic polystyrene", Progress in Polymer Science, 2009, 34, 280-315.

Ma et al., "Direct formation of γ form crystal of syndiotactic polystyrene from amorphous state in supercritical $CO_2$", Macromolecules 2004, 37, 6912-6917.

Chiang et al., "The mass transport of ethyl acetate in syndiotactic polystyrene", Polymer Engineering & Science, 42(4): 724-732, Apr. 2002.

Notification of the First Office Action issued May 6, 2014 in Japanese Application No. 201180067400.0.

* cited by examiner

DISORDERED NANOPOROUS CRYSTALLINE FORM OF SYNDIOTACTIC POLYSTYRENE, PROCESS FOR ITS PREPARATION AND ARTICLES COMPRISING THE SAME

CROSS REFERENCE TO RELATED APPLICATIONS

This application is a National Phase filing under 35 U.S.C. §371 of PCT/EP2011/074227 filed on Dec. 29, 2011; and this application claims priority to Application No. MI2010A002460 filed in Italy on Dec. 20, 2010 under 35 U.S.C. §119; the entire contents of all are hereby incorporated by reference.

The present invention relates to a disordered nanoporous crystalline form of syndiotactic polystyrene, to the process for its preparation and to articles comprising the same.

Syndiotactic polystyrene (s-PS) is a semi-crystalline thermoplastic polymer which exhibits a very complex polymorphism, as reported, for example, in G. Milano, G. Guerra *Progress in Materials Science* 2009, 54, p. 68. In particular, two crystalline forms (α and β), characterized by planar zigzag chain conformations, can usually be obtained by melt manufacture processes, while three other crystalline forms (γ, δ and ε), characterized by s(2/1)2 helical chain conformations, are obtained from solution manufacture processes.

Some of the crystalline forms of syndiotactic polystyrene are nanoporous, as reported in C. De Rosa, G. Guerra, V. Petraccone, B. Pirozzi, *Macromolecules*, 1997, 30, p. 4147-4152, and in V. Petraccone, O. Ruiz de Ballesteros, O. Tarallo, P. Rizzo, G. Guerra *Chemistry of Materials*, 2008, 20, p. 3663. These nanoporous crystalline forms are δ- or ε-forms. In particular, the δ-form is characterized by X-ray diffraction spectra presenting higher intensity reflections at 2θ (CuKα) approximately equal to 8.4°, 10.6°, 13.4°, 16.8°, 20.7° and 23.5. The ε-form is instead characterized by an X-ray diffraction spectrum presenting higher intensity reflections at 2θ (CuKα) approximately equal to 6.9°, 8.2°, 13.8°, 16.4°, 20.5°, 23°.

s-PS in the δ- and/or ε-forms is capable of absorbing in the crystalline phase (i.e. to form co-crystalline phases with), volatile organic compounds absorbed from liquid or gaseous mixtures, also when those compounds are present in low concentrations. These nanoporous crystalline forms of s-PS are therefore useful, for example in molecular separation processes.

Moreover, the nanoporous forms of s-PS efficiently absorb ethylene (A. Albunia, T. Minucci, G. Guerra, *J. Mater. Chem* 2008, 18, 1046) and carbon dioxide (L. Annunziata, A. R. Albunia, V. Venditto, G. Mensitieri, G. Guerra *Macromolecules* 2006, 39, 9166). It has therefore been proposed that films constituted by nanoporous syndiotactic polystyrene can be used as functional active packaging material for fruit and plants, as they are suitable to remove ethylene and carbon dioxide molecules emitted by these products.

A functional active packaging is defined as such as besides performing the primary function of containing a product, it also carries out other functions defined as "active", mainly the function of improving product preservation. In the case of biologically active products, i.e. food products such as fruit and vegetables or floriculture products, active packaging performs the function of extending the time for which products remain fresh. Active packaging is therefore a system capable of interacting positively with a biologically active product, generally a food or a plant with which it is in contact or exposed, in order to obtain performances which cannot be obtained with conventional packaging.

It is also known that starting from the nanoporous crystalline forms δ and/or ε, following absorption of appropriate active guest molecules, it is possible to form co-crystalline phases, thereby generating materials (films in particular) with noteworthy properties. With respect to the conventional method of dispersing the active molecules in amorphous polymer phases, these co-crystalline phases have the dual advantage of greatly reducing the diffusivity of the guest molecules in the polymer and, if necessary, of controlling the orientation of these molecules, also at macroscopic level. In particular, s-PS films exhibiting special functions (optical, electrical, magnetic and chemical), generated by incorporating active guest molecules in co-crystalline phases, have been described.

As commercially available syndiotactic polystyrene is in α-form, to obtain the nanoporous δ and/or ε forms it must be transformed into the α form, into the δ form or into the ε form by treatment with specific organic compounds, or by dissolving the s-PS (α form) in organic solvents.

However, the solvents adapted to transform the syndiotactic polystyrene from the α form to a co-crystalline form, from which the nanoporous δ or ε form can in turn be obtained, have a negative environmental impact, i.e. they are toxic and/or harmful solvents such as aromatic solvents or chlorinated solvents. These substances are therefore excluded from the substances which can be used in the manufacture of materials and objects made of plastic materials intended to come into contact with foodstuffs according to the regulations in force in the European Union.

WO 2005/012402, WO 2008/023331 and EP 1190767 A1 are patent documents illustrating the technologies described above.

WO 2005/012402 describes the preparation of microporous products in s-PS δ form by dissolving s-PS in chloroform, forming a gel and subsequently extracting the chloroform using a supercritical $CO_2$ treatment procedure.

WO 2008/023331 describes the preparation of polymer materials in s-PS ε form by dissolving s-PS in chloroform, obtaining the γ form, treating this latter once again with chloroform and subsequently extracting the chloroform using a supercritical $CO_2$ treatment procedure.

EP 1 190 767 A1 describes the preparation of s-PS films capable of absorbing organic compounds such as hydrocarbons. These films (cast films) are obtained by casting a solution of s-PS in an aromatic solvent and subsequently removing the solvent.

The use of toxic and/or harmful solvents in the production technologies described above makes the materials obtained absolutely unsuitable for producing packaging intended for the food sector.

RIZZO Paola et al: "Thermal transitions of epsilon crystalline phases of syndiotactic polystyrene", MACROMOLECULES, American Chemical Society, Washington, D.C., USA, vol. 40, No. 26, 22 Nov. 2007, p. 9470-9474, disclose a nanoporous s-PS material in which FIG. 1, curve B, shows the main diffraction peak for 2θ<15° at 2θ=8.4°. This value is explicitly indicated between curves a and b and enlargements of FIG. 1 clearly show that the peaks at lowest diffraction angle, for both spectra of FIGS. 1a and 1b, are located at 2θ=8.4°. This value is clearly outside the 2θ range 8.7°-9.8° characterizing the s-PS of the present invention.

RIZZO Paola et al: "Crystalline orientation in syndiotactic cast films", MACROMOLECULES, American Chemical Society, Washington, D.C., USA, vol. 35, No. 15, 16 Jul. 2002, p. 5854-5860, disclose a nanoporous s-PS material in which FIG. 1, curve B, shows the main diffraction peak for 2θ<15° at 2θ=8.37°, as explicitly reported in the first row, second column of Table 2 of pag. 5856. This value is well outside the range 8.7°-9.8° characterizing the s-PS of the present invention.

DANIEL C. et al: "Crystallization from the amorphous form of the nanoporous epsilon form of syndiotactic polystyrene", POLYMER, Elsevier Science Publishers B.V., GB, vol. 51, No. 20, 17 Sep. 2010, p. 4599-4605, disclose a nanoporous s-PS material which has the structural features mentioned at the third paragraph of page 4601, namely: "The chloroform treated α form sample (FIG. 1B) presents a similar crystallinity (nearly 30%) than the chloroform treated amorphous sample but clearly exhibits the δ crystalline form, with the typical intense (010) peak, in the low 2θ range, at d≈1.06 nm (2θCuKα≈8.4°) (FIG. 1B) instead of the ε crystalline form". Hence, for the sample of FIG. 1B the main diffraction peak for 2θ<15° is located at 2θ=8.4°. i.e. well outside the range 8.7°-9.8° characterizing the s-PS of the present invention.

A disordered crystalline form of s-PS is also known, defined as mesomorphous in C. Manfredi, C. De Rosa, G. Guerra, M. Rapacciuolo, F. Auriemma, P. Corradini, *Macromol. Chem. Phys.*, 1995, 196, p. 2795. This mesomorphous form is characterized by an X-ray diffraction spectrum exhibiting only two broad peaks centered at 2θ (CuKα) approximately equal to 10° and 19.5°. This mesomorphous form, obtained with a thermal process from the δ form, does not absorb significant quantities of ethylene and carbon dioxide.

It is also known that rapid quenching of a molten phase of s-PS, typically with quenching speeds of over 50° C./min, leads to the formation of completely amorphous s-PS (G. Guerra, V. M. Vitagliano, C. De Rosa, V. Petraccone, P. Corradini; Polymorphism in melt crystallized syndiotactic polystyrene samples; *Macromolecules*, 1990, 23, 1539). However, the literature does not describe how to obtain amorphous s-PS with methods other than quenching of a molten phase.

An object of the present invention is to provide a material suitable for use in the field of functional active products, in particular in the field of functional active packaging for the food sector.

Another object is that of providing a process for the preparation of this material which does not involve the use of compounds having a negative environmental impact, such as toxic and/or harmful solvents.

A further object of the present invention is to provide functionally active articles comprising this material.

An aspect of the present invention therefore relates to a new disordered nanoporous crystalline form of syndiotactic polystyrene, the X-ray diffraction spectrum of which, as measured by an automatic powder diffractometer, is characterized by the presence, at 2θ (CuKα)<15°, of only two broadened peaks with maxima in the intervals 8.7°<2θ (CuKα)<9.8° and 13.0°<2θ (CuKα)<13.8°, and with a half height width of at least 2°.

Another aspect of the invention relates to the process for preparation of s-PS in disordered nanoporous crystalline form defined above, which is characterized by comprising the steps of:
a) converting the syndiotactic polystyrene from the commercially available a form into amorphous s-PS;
b) treating said amorphous s-PS with a co-crystallizing agent and obtaining a co-crystalline form of s-PS with said co-crystallizing agent;
c) removing said co-crystallizing agent and obtaining s-PS in disordered nanoporous crystalline form.

A further aspect of the invention relates to functionally active articles comprising s-PS in disordered nanoporous crystalline form. More in particular, these articles are functionally active packaging constituted by completely or partly by s-PS in disordered nanoporous crystalline form.

The term syndiotactic polystyrene (s-PS) is intended as the polymer in which the syndiotactic structure is present at least for long portions of the chain, in order to allow crystallization. This polymer is obtained through polymerization of the styrene catalyzed by an organometallic compound, according to the method described in EP 0 271 875. The syndiotactic polystyrene is also available commercially, for example in the degrees denominated "XAREC" SPS by Idemitsu. Within the scope of the present invention, the definition of syndiotactic polystyrene also comprises, besides the homopolymer, styrene copolymers with $CH_2=CH-R$ olefins, wherein R is an alkyl-aryl or a substituted aryl, containing 6-20 carbon atoms, or with other copolymerizable ethylenically unsaturated monomers, said copolymers being provided with a prevailingly syndiotactic microstructure and with a molar content of styrene greater than 60%. An example of these copolymers is the copolymer styrene/p-methylstyrene.

The syndiotactic polystyrene in the new nanoporous crystalline form named "disordered nanoporous" by the present inventors, which is characterized by the X-ray spectrum defined above, is also characterized by helical chain conformations as shown by infrared absorption spectra which exhibit characteristic absorption peaks, such as those located at 572 $cm^{-1}$ and 502 $cm^{-1}$ (as described in detail in Torres, F. Javier; Civalleri, Bartolomeo; Meyer, Alessio; Musto, Pellegrino; Albunia, Alexandra R.; Rizzo, Paola; Guerra, Gaetano. Normal Vibrational Analysis of the Syndiotactic Polystyrene s(2/1)2 Helix. Journal of Physical Chemistry B (2009), 113 (15), 5059-5071. Starting from these spectra, it is also possible to evaluate the quantity of polymer in regular helical conformation, generally used to evaluate the degree of crystallinity of helical crystalline forms. These evaluations, performed for example with the method described in the paper A. R. Albunia, P. Musto, G. Guerra, FTIR spectra of pure helical crystalline phases of syndiotactic polystyrene, *Polymer* 2006, 47, 234-242, allow degrees of crystallinity between 5 and 50% to be obtained, similar to those obtained for the known helical crystalline forms (γ, δ and ε). The combination of the information deriving from the infrared spectra, which indicate helical chain quantities similar to those present in the other crystalline forms, with the information deriving from the X-ray diffraction spectra, i.e. the presence of a few broadened diffraction peaks, lead to the conclusion that the new crystalline form is characterized by very small disordered crystals.

The process for the preparation of s-PS in disordered nanoporous crystalline form entails a first step a) of obtaining amorphous s-PS which can be obtained with two different methods, one known to the state of the art ($a_1$) and the other new ($a_2$), which therefore forms a further aspect of the invention.

The known method ($a_1$) for forming amorphous s-PS consists in the rapid quenching of s-PS in molten phase, previously cited and described in G. Guerra, V. M. Vitagliano, C. De Rosa, V. Petraccone, P. Corradini; Polymorphism in melt crystallized syndiotactic polystyrene samples; *Macromolecules*, 1990, 23, 1539.

The new method ($a_2$) consists in the milling of commercial s-PS granules, for example in a form (FIG. 1A), to obtain powders of micrometric size exhibiting an X-ray diffraction spectrum that does not contain clear peaks but only two broad halos with diffraction maxima located at diffraction angles 2θ CuKα approximately equal to 10° and 19.5° (FIG. 1B).

These amorphous s-PS powders, which constitutes the precursor of the final nanoporous s-PS desired, are not described in the literature and therefore form a subject matter of the present invention, as does the related process for their preparation described below.

The amorphous syndiotactic polystyrene powders of micrometric size can be obtained starting from granules of syndiotactic polystyrene in the α crystalline form, through milling and subsequent optional sieving.

Milling can be conducted in the substantial absence of all liquid components or in the presence of at least one liquid dispersing medium such as water or an environmentally friendly solvent, such as ethyl acetate or methyl ethyl ketone.

In a preferred mode, milling is conducted at a temperature from −100° C. to 60° C., preferably from −50° C. to 40° C., for a time from 10 minutes to 7 hours, preferably from 1 hour to 3 hours.

Any conventional grinder or mill can be used, which operates both dry and wet and both in continuous and discontinuous mode, and which is capable of supplying sufficient energy to reduce the syndiotactic polystyrene granules into powder having a grain size of ≤500 μm, preferably ≤300 μm, wherein evaluation of the grain size produced can be determined by any technique and/or equipment which allows evaluation of particle size distribution, such as by sieving (e.g.: ASTM C136-06).

Preferably, the following types of mill are used: mortar, disc, ball or blade mills. These types of mill can be used both alone and in combination with one another in subsequent stages.

Any instrument capable of sieving powders and capable of separating micrometric fractions can be used. Sieves, of manual or automatic type, with either steel or nylon mesh, can be used. For automatic sieves the movement can be either three-dimensional or rotary.

The sieving operation can be performed either dry or wet. Sieves which can be used are, for example: Retsch series AS 400, ANALYSETTE 3 PRO by Fritsch, and others which those skilled in the art choose to use.

The process for the preparation of s-PS in disordered nanoporous crystalline form entails a second step b) of treating amorphous s-PS with a co-crystallizing agent which gives rise to a co-crystalline form of s-PS with the crystallizing agent.

Compounds capable of causing the formation of co-crystalline phases in amorphous samples of syndiotactic polystyrene are defined in the present description as "co-crystallizing agents".

The co-crystallizing agent is selected from a group of non-toxic and/or non harmful compounds, allowed by European legislation for the production of articles intended to come into contact with foods.

The compound must satisfy the following characteristics:
A) it must not be a solvent of syndiotactic polystyrene, i.e. not be capable of dissolving this polymer at temperatures below 100° C.;
B) it must have a molecular volume of less than 0.4 nm, where the molecular volume is defined on the basis of the formula $V_{osp}=M/(\rho N_a)$ where M and ρ are their molecular mass and density and $N_a$ is the Avogadro number;
C) it must have low acidity and in particular an acid constant $pK_a>16$;
D) it must have a low basicity and in particular a basic constant $pK_b>10$.

Examples of co-crystallizing agents according to the present invention are ethyl acetate, methyl acetate, n-propyl acetate, iso-propyl acetate, butyl acetate, methyl ethyl ketone, 2-pentanone, 3-pentanone, methyl benzoate, N-methylpyrrolidone. Examples of particularly preferred co-crystallizing agents are ethyl acetate, methyl acetate and methyl ethyl ketone.

Contact between the co-crystallizing agent and the amorphous s-PS can entail immersion of the amorphous s-SP in the co-crystallizing agent in liquid form or exposure of the article to vapors of the co-crystallizing agent so that the amorphous s-PS absorbs the co-crystallizing agent.

The immersion or contact time is defined as the minimum time to complete the phenomenon of co-crystallization in the amorphous sample, i.e. formation of a co-crystalline phase between the polymer and the co-crystallizing agent, which is characterized by a degree of crystallinity between 5 and 50%.

The immersion or contact time also depends on the physical form of the amorphous s-PS to be treated. Physical forms such as a powder of micrometric size or an article obtained from a melt according to processing technologies for plastic materials, such as extrusion, molding, filming and the like, require different contact times.

In the case in which an article in amorphous s-PS is obtained from molten s-PS, according to the thickness of the article, the amorphous s-PS can be constituted by only a surface layer of this article, in which the solidification conditions, in terms of temperature, pressure and deformation velocity histories, are such as to form amorphous s-PS. Consequently, the disordered nanoporous crystalline form obtained through subsequent treatment with the co-crystallizing agent will also constitute a surface layer of the same article.

The third step c) of removing the co-crystallizing agent and of forming the disordered nanoporous crystalline form takes place with the methods used to form the nanoporous δ or ε forms.

In particular, in the case of fine powders and of very thin films, it is possible to carry out desorption of the previously absorbed co-crystallizing agent, in environments characterized by low concentration of the co-crystallizing agent, with or without heating. Alternatively, removal of the co-crystallizing agent can be carried out through supercritical $CO_2$ treatment, analogously to the methods used to form the nanoporous δ or ε forms, as described for example in WO 2005/012402 and WO 2008/023331. Removal of the co-crystallizing agent can also be carried out through treatment with volatile organic solvents which are capable of being temporary guests of co-crystalline phases with s-PS, such as acetone or methyl ethyl ketone, as described for example in the patent EP 387608.

As has been stated, syndiotactic polystyrene in disordered nanoporous crystalline form exhibits empty crystalline cavities of nanometric sizes, and in this case performs the function of absorbing molecules with low molecular weight, both from gaseous and liquid phases, or exhibits crystalline cavities containing active guest molecules, and in this case performs the function of immobilizing or slowly releasing these guest molecules.

The present invention also relates to rigid and flexible articles or products comprising syndiotactic polystyrene in the disordered nanoporous crystalline form according to the present invention.

In the present description the terms "article" and "product" are used in an essentially interchangeable manner and designate both semi-finished and finished articles which can be used directly by a user.

These articles or products can be constituted completely or partly by syndiotactic polystyrene in the disordered nanoporous crystalline form, i.e. they can comprise even only portions or layers of syndiotactic polystyrene in the disordered nanoporous crystalline form, which makes them active in the sense explained above.

According to an embodiment, the article is a monolayer film constituted by syndiotactic polystyrene in the disordered nanoporous crystalline form.

According to another embodiment, the article is a multi-layer film in which one or more layers are constituted by syndiotactic polystyrene in the disordered nanoporous crystalline form and one or more layers are constituted by another polymer material, such as polypropylene. The multilayer film can for example be a two-layer or three-layer film, in which case the film in syndiotactic polystyrene in the disordered nanoporous crystalline form is interposed between two films in another polymer material, for example two layers of polypropylene.

According to another embodiment, the article comprises a structural portion constituted by crystalline s-PS in α form, and by a surface layer of the same article constituted by s-PS in the disordered nanoporous crystalline form. This form is obtained, as stated above, by rapid quenching from molten state, with formation of products in α form with a surface layer of amorphous s-PS. The surface layer is then treated with a co-crystallizing agent capable of generating s-PS in the co-crystalline form, from which the disordered nanoporous crystalline form is obtained, by removal of the co-crystallizing agent. This results in obtaining an article comprising an internal structural part constituted by s-PS in α crystalline form, and a surface layer constituted by s-PS in disordered nanoporous crystalline form, therefore a functionally active article as defined previously.

According to a further embodiment, the functionally active article comprises a portion made of syndiotactic polystyrene in the disordered nanoporous crystalline form obtained by depositing an s-PS powder on the part of the product to be made active.

Another aspect of the invention is therefore constituted by a coating composition comprising an amorphous s-PS powder dispersed in a medium comprising a co-crystallizing agent as defined previously, this coating composition being usable to produce the deposition process.

This coating composition comprises particles of s-PS in amorphous form having a size of less than 300 μm and a dispersing medium constituted by a co-crystallizing agent as defined above. In this case the disordered crystalline form is obtained through contact between the amorphous form and the crystallizing agent.

Alternatively, the coating composition comprises particles of s-PS in amorphous form having a size of less than 300 μm and a dispersing medium not constituted by a co-crystallizing agent, for example an alcohol or a glycol or water. In this case the disordered crystalline form is obtained by contact between the amorphous form deposited on the product after removal of the dispersing medium and by contact with the co-crystallizing agent as defined above.

A particular aspect of the invention is therefore constituted by a coating composition comprising particles of s-PS in amorphous form having an average size of less than 150 μm dispersed in a dispersing medium selected from ethyl acetate, methyl acetate, methyl ethyl ketone.

Application of this coating composition on a substrate and subsequent removal of the dispersing medium/co-crystallizing agent leads to the formation in situ of s-PS in disordered nanoporous crystalline form.

A further aspect of the present invention is that articles constituted partly by s-PS in disordered nanoporous crystalline form and partly by conventional polymers with good water barrier properties, such as polyethylene and above all isotactic polypropylene, polyethylene terephthalate, nylon 6 and nylon 6,6, unexpectedly exhibit a capacity of prolonging the shelf life of plants which is much higher, not only compared to that of articles constituted by conventional polymers, but also compared to that of articles constituted only by s-PS in disordered nanoporous crystalline form.

The process in three steps described above, used to obtain the disordered nanoporous crystalline phase of s-PS, can also be used to prepare products with aromatic, antimicrobial, antioxidant, and/or pharmacological products, using a suitable formulation for step b).

In order to impart aromatic, antimicrobial, antioxidant, and/or pharmacological properties to the product, it is in fact sufficient for the co-crystallizing agent to have these properties and for it to be only partly removed in step c), maintaining in the product based on s-PS a concentration between 0.1% and 40% by weight. Alternatively, these molecules with aromatic, antioxidant, antimicrobial and/or pharmacological properties can be dissolved in concentrations between 1% and 50% in the co-crystallizing agent of s-PS used in step b).

These aromatic, antioxidant, antimicrobial or pharmaceutical compounds are characterized by a molecular volume of less than 0.4 nm$^3$, and must be capable of co-crystallizing, i.e. be incorporated in a quantity between 5% and 50% by weight in the co-crystalline structure based on syndiotactic polystyrene.

Compounds with these requirements are, for example, vanillin and anethole (aromatic), butylhydroxyanisole (antioxidant), ethanol and methyl p-hydroxybenzoate (antimicrobial), thymol and carvacrol (antioxidant and antimicrobial), acetylsalicylic acid (pharmaceutical).

For example, at least one compound having at least one of these activities can be added to the dispersion containing syndiotactic polystyrene, before deposition on the substrate. Addition of the active molecules to the substrate through an operation to deposit a coating layer, preventing dispersion thereof in the mass of the material, can make it unnecessary to expose the molecules to high processing temperatures, at which they also could be subject to phenomena of degradation and/or deactivation.

According to another aspect of the present invention, the dispersing medium of the micrometric syndiotactic polystyrene powders is present in the coating composition in a quantity between 30 and 90% by weight, preferably between 40 and 80% by weight, even more preferably between 50 and 70% by weight.

The coating composition according to the present invention preferably comprises, in addition to the syndiotactic polystyrene dispersed in the dispersing medium, at least one polymer binder capable of adhering to the substrate to be coated. Alternatively, a composition without binder can be deposited on the substrate and subsequently be coated with a composition containing binder so as to form a new coating layer capable of adhering to the substrate.

Types of polymer binders which can be used are: acrylic polymers, urethane polymers, urethane-acrylic polymers, polyvinyl alcohol, polyvinyl pyrrolidone, polyacrylamide, polyvinyl acetamide, cellulose polymers, guar gum.

According to an aspect of the present invention, the polymer binder is present in quantities between 10 and 50% by weight, preferably between 15 and 35% by weight.

Types of dispersing agents which can be used for the following invention are anionic, cationic and nonionic surfactants.

Types of thickening agents which can be used for the present invention are: cellulose derivatives (such as sodium carboxymethyl cellulose or hydroxymethyl cellulose), modified cellulose derivatives, polyacrylates, acrylic polymers, polyols, urethane polymers, xanthorrhoea gum and guar gum, organoclays, castor oil derivatives, wax dispersions based on polyoxypropylene, polyamides, polysiloxanes, etc.

The substrates to which the coating composition according to the invention can be applied in order to obtain functionally active articles can be flexible substrates or rigid substrates.

Types of substrates which can be used are: paper, wood, glass, synthetic polymers, such as polyethylene and copolymers of ethylene, isotatic polypropylene and copolymers of isotactic propylene, such as polyethylene terephthalate and poly(lactic acid), polyamides. Said substrates can be previously subjected to plasma treatment or corona treatment.

With reference to the size of the particles of s-PS in the process and in the coating composition of the invention, the following types of functionally active articles can be defined by way of example:

opaque coating with particles of s-PS from 150 to 50 μm: tarpaulins for fruit and flower transport vehicles, filter media and membranes;

semi-opaque or opaque coating with particles of s-PS from 50 to 10 μm: paper and films for packaging fruit and flowers, bags for fruit, coverings for hothouses for growing fruit and vegetables;

opaque transparent coating with particles of s-PS of less than 10 μm: adhesive tapes, labels for fruit and vegetables.

The coating composition according to the invention is stable at normal storage conditions of the formulations used in industrial practice.

According to a further object of the present invention, the coating composition comprises, in addition to the micrometric s-PS powders, an environmentally friendly dispersing agent, non-solvent for syndiotactic polystyrene, and a polymer binder, also one or more selected from: an additive belonging to the classes of: surfactants, emulsifiers, antifoaming agents, dispersing agents, thickening agents, and a compound with antioxidant or antimicrobial activity.

As stated previously, in fact, a functionally active packaging requires the use, for a container or a packaging accessory, of at least one material capable of performing an additional active function relative to the containing and protecting functions normally performed by the packaging. These active packagings can perform their action, for example, by removing undesirable volatile substances or substances that accelerate ripening and rotting from the food, or by immobilizing or releasing substances with antimicrobial and/or antioxidant properties.

With regard to substances that accelerate degradation, it is known that ethylene and carbon dioxide molecules have a negative effect on fruit and vegetables, reducing their shelf-life. In fact, ethylene is a plant hormone produced in greater or lesser quantities by plants and fruit in order to trigger and promote ripening processes, which on the one hand make the product edible and palatable but on the other cause its aging. To remove ethylene from packages containing foodstuffs and flowers, agents known in the art are used; these are designed to absorb the ethylene present in the atmosphere inside the package, and therefore capable of preserving the freshness of the foodstuffs and flowers. A large number of agents, used to preserve the freshness of these products through ethylene absorption, are know. These include activated carbon, brominated carbon, silver chloride and aluminum chloride, on an alumina support, metal oxides, zeolites, sepiolites, powdered silica in the form of cristobalite, permanganates, for example of potassium.

Substances with antioxidant and/or antimicrobial properties are often added to foods, to their packages or to the materials used for their packaging. In particular, widely used antioxidant substances are, for example, ascorbic acid and related salts, tocopherols, gallates butylhydroxyanisole (BHA), butylhydroxytoluene (BHT), lactic, citric and tartaric acids and related salts. Antimicrobial substances widely used are for example sorbic, benzoic, acetic, propionic acids and related salts, p-hydroxy-benzoates of ethyl, propyl and methyl and related salts, sulfur dioxide, biphenyl, o-phenylphenol, sodium and potassium nitrites and nitrates. The use is also known of antimicrobial substances or antioxidant substances capable of removing undesirable volatile compounds, such as additives in polymer films not made of s-PS used in the packaging of foods and more in general of organic substances or in the packaging of products and devices for biomedical use.

These films are also available commercially. For example, for the removal of ethylene from fruit and vegetables, the film Peakfresh™ produced by Peakfresh Products Ltd, the film Bio-Fresh produced by Grofit Plastics and the film Evert-Fresh produced by Evert-Fresh Co. are available commercially, all in polyethylene with clays and zeolites incorporated, or the film Primavera by Inpack Co. in polypropylene (PP) with Oya-stone incorporated. Also available commercially are films with antimicrobial activity, such as the film ILC Biolam™ produced by International Laminating Corporation which incorporates AgION™, the film Aseptrol® produced by BASF Catalysts LLC which incorporates chlorine dioxide, and others.

BRIEF DESCRIPTION OF THE DRAWINGS

Attached to the present description are eleven drawings showing.

Some non-limiting illustrative examples of the invention are described below.

EXAMPLES

A. Preparation Of Amorphous s-PS

Example 1

Figure 1:
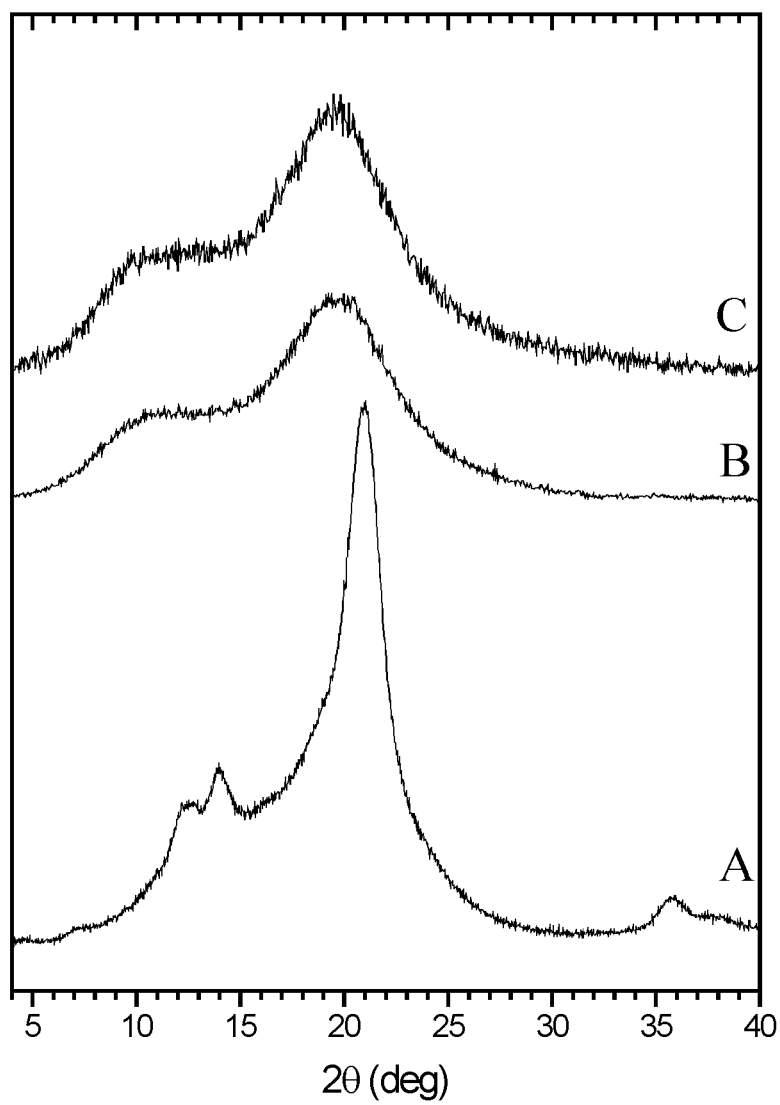
FIG. 1: X-ray diffraction spectra (CuKα) of samples of s-PS: (A) industrially produced granules; (B) powders, obtained by milling industrially produced granules; (C) film obtained by melting industrially produced granules followed by rapid quenching.

Syndiotactic polystyrene supplied by Dow Chemical Company with the trademark QUESTRA 101 in granule form was used, the X-ray diffraction pattern of which is shown in FIG. 1A. The polymer was milled for 3 hours using a Fritsch Pulverisette 2 mortar grinder mill, reducing it to fine powder which was sieved to recover the fraction below 10 μm. The powder obtained was amorphous, as highlighted by the X-ray diffraction pattern shown in FIG. 1B. The diffraction pattern of an amorphous film obtained using the customary melt procedure followed by rapid quenching from molten state is shown for comparison in FIG. 1C.

Example 2

Obtaining Amorphous s-PS Powders in a Three-Step Milling Process 10 kilograms of syndiotactic polystyrene in α crystalline morphology and in the form of pellets, having a base diameter of 3 mm and height of 4 mm, were reduced to amorphous powder using a three-step milling process: a first step, entailing cryogenic grinding treatment of the pellets; a second step, entailing a second passage of the powders obtained from the first step through the cryogenic grinding system; a third step, performed at ambient temperature on the powders obtained from the second grinding step.

In the continuous cryogenic grinding system the s-PS pellets were fed to an auger cooled by liquid nitrogen.

Through the auger, the pellets cooled to the temperature of the liquid nitrogen reached a milling apparatus, constituted by a pin mill, and were reduced therein to powder, which was collected at the outlet of the mill in a bag positioned under the same mill, positioned in a raised position. The temperature of the s-PS powders delivered from the mill was between −25 and −45° C.

The powders obtained from the two subsequent cryogenic milling steps were still prevalently crystalline, with a crystallinity level substantially similar to that of the initial material, and were composed of a fraction of which 60% by weight passes through a 150 μm sieve, while 98% by weight passed through a 315 μm sieve.

Some examples of pin mills which can be used are: Controrotor C30 pin mill (CIMMA Ing. Morandotti SPA); DC2B pin mill (Manfredini & Schianchi); series MP pin mill (STM Impianti); etc.

The powders coming from the first milling step were subjected to a second milling step, conducted at ambient temperature using a hammer mill operating continuously.

The dwell time of the powders in the mill was adjustable.

The powders collected at the outlet of this second mill were for the most part amorphous and were composed of a fraction of which 95% by weight passed through a 63 μm sieve.

Some examples of hammer mills which can be used are: series "PPS" micronizer mill (CIMMA Ing. Morandotti SPA); P.I.G. hammer mill (Manfredini & Schianchi); Mikro Pulverizer® hammer mill (Hosokawa Micron Powder Systems); etc.

Example 3

Obtaining Amorphous s-PS Powders in a Single-Step Milling Process 2.5 kilograms of syndiotactic polystyrene in α crystalline morphology and in the form of pellets, having a base diameter of 3 mm and height of 4 mm, were reduced to amorphous powder using a single-step milling process.

The s-PS pellets were fed to a hammer mill operating at ambient temperature and continuously.

The dwell time of the powders in the mill was adjustable from 15 minutes to 1 hour per kg of material fed.

The powders collected at the outlet of the mill were for the most part amorphous and were composed of a fraction of which 8% by weight passed through a 100 μm sieve, while 38% by weight passed through a 200 μm sieve.

Some examples of hammer mill which can be used are: series "PPS" micronizer mill (CIMMA Ing. Morandotti SPA); P.I.G. hammer mill (Manfredini & Schianchi); Mikro Pulverizer® hammer mill (Hosokawa Micron Powder Systems); etc.

Example 4

Obtaining s-PS Granules in Amorphous Form Through an Extrusion Process

A commercial syndiotactic polystyrene was used: QUESTRA 101.

3 kilograms of this syndiotactic polystyrene in α crystalline morphology, with percentage of crystallinity of 45% determined through X-ray diffraction, in the form of pellets with base diameter of 3 mm and height of 4 mm, were reduced to granules with amorphous morphology by means of an extrusion process and rapid quenching of the melt in water.

The process to form the amorphous granules entailed feeding the syndiotactic polystyrene pellets in α form to the extrusion system, constituted by a double screw extruder, with screw diameter of 20 mm and rotation speed of 599 rpm. The flow rate used was equal to 3 kg/hour and the temperature of the melt was between 280 and 310° C. At the outlet of the extruder, the molten strands with diameter 1.5 mm were rapidly immersed in a bath of water maintained at ambient temperature (approximately 20° C.), obtaining rapid quenching of these strands which were then reduced into granules by cutting in the air. The final granules had a diameter of approximately 1.5 mm and proved to be amorphous following X-ray diffraction analysis.

Some examples of extruders which can be used are: TM20LAB and TM30 twin screw extruder (MARIS SPA); TSE 20, TSE 25, TSE 35 twin screw extruder (Brabender); MCM twin screw extruder (ICMA SAN GIORGIO); etc.

B. Preparation of Disordered Nanoporous Crystalline s-PS

Example 5 s-PS Film Obtained by Extrusion, with Disordered Nanoporous Crystalline Phase

Syndiotactic polystyrene produced by Dow Chemical with the trademark QUESTRA 101 supplied in granule form was used. Films, with a thickness of approximately 40 μm, completely amorphous, were obtained by an extrusion process, with a melt temperature of 300° C. These amorphous films exhibited the X-ray diffraction pattern shown in FIG. 1C.

The amorphous films obtained through the extrusion process were crystallized by immersion in ethyl acetate at 25° C. for at least 5 minutes and subsequent desorption by supercritical carbon dioxide treatment for 10 minutes at 200 atm and 40° C. A material with an ethyl acetate content of less than 0.1% by weight was obtained.

Figure 2:
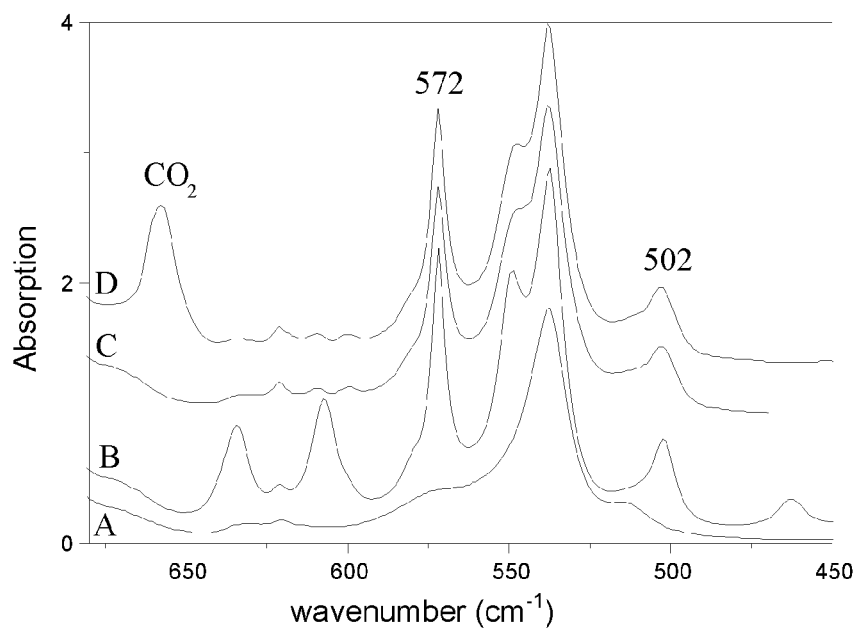
FIG. 2: Fourier transform infrared (FTIR) spectra, in the region between 700 and 450 $cm^{-1}$, of films based on s-PS: A—amorphous; B—co-crystalline obtained by treatment of the amorphous film with ethyl acetate; C—film with disordered nanoporous crystalline phase; D—film with disordered nanoporous crystalline phase after absorption of carbon dioxide produced by apples.

The crystallizing process of the amorphous sample following absorption of ethyl acetate was clearly shown by the increase in the intensity of the infrared absorption peaks associated with vibrational modes of the helices of the crystalline phase, located at 571 and 502 $cm^{-1}$ (FIG. 2).

In the case of the film of the present example, the crystallization process was complete after 4 minutes of immersion in ethyl acetate (FIG. 2B) and after removal of the ethyl acetate a degree of crystallinity was observed evaluated at approximately 28%, following the method based on analysis of infrared absorption spectra (FIG. 2C), as described in the above-mentioned work by Albunia, Musto, Guerra.

Figure 3:
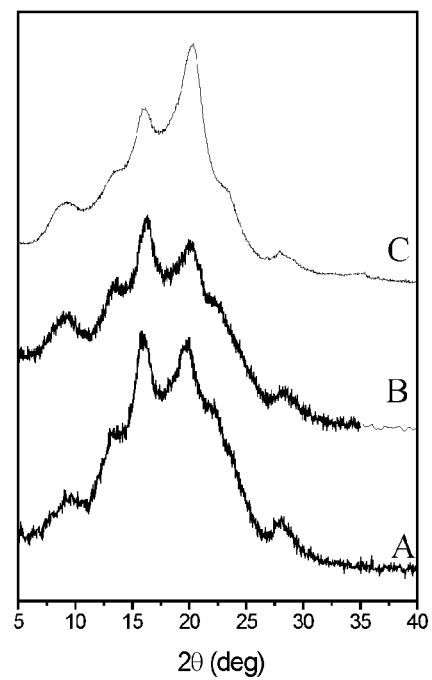
FIG. 3: X-ray diffraction spectra of samples of s-PS with disordered nanoporous crystalline phase: A—extruded film; B—sheet from injection molding; C—powder.

The X-ray diffraction pattern (CuKα) of the film, after removal of the ethyl acetate, showed broadened reflections at 2θ (CuKα) equal to 9.3° and 13.5° (FIG. 3A). In particular, the peak centered at 9.3° is characterized by a half height width equal to 2.5°.

These films absorb carbon dioxide, as shown for example by the absorption peak located at 658 $cm^{-1}$ which is present in the infrared spectrum of the nanoporous film, obtained after exposure to $CO_2$ at 15 atm and 40° C. (FIG. 2D). Moreover, after reaching equilibrium followed by one minute of air desorption, these films absorbed 3.3% by weight of 1,2-dichloroethane from aqueous solution with concentration equal to 50 ppm and 1.8% by weight of ethylene from gaseous ethylene at 1 atm and 25° C.

Example 5A s-PS Fibres Obtained from Melt Spinning, with Disordered Nanoporous Crystalline Phase Syndiotactic polystyrene produced by Dow Chemical with the trademark QUESTRA 101 supplied in granule form was used. Fibres with a thickness of approximately 20 μm, completely amorphous, were obtained by a melt spinning process, with a melt temperature of 310° C., by using spinnerets with holes having a diameter of 0.200 mm and a draw ratio upon spinning of 100.

Such amorphous fibres obtained by the melt spinning process were crystallized by immersion in ethyl acetate at 25° C. for 5 minutes and followed by desorption in air for 1 hour at 50° C. A material with an ethyl acetate content of less than 0.1% by weight was obtained.

The crystallizing process of the fibres following absorption of ethyl acetate was clearly shown by the increase in the intensity of the infrared absorption peaks associated with vibrational modes of the helices of the crystalline phase, located at 571 and 502 $cm^{-1}$.

In the case of the fibres of the present example, after removal of the ethyl acetate a degree of crystallinity was observed evaluated at approximately 30%, following the method based on the above-mentioned analysis of infrared absorption spectra.

The X-ray diffraction pattern (CuKα) of the fibres after removal of the ethyl acetate, showed broadened reflections at 2θ (CuKα) equal to 9.3° and 13.5°. In particular, the peak centered at 9.3° was characterized by a half height width equal to 2.5°.

These fibres absorbed, upon reaching the equilibrium, more than 3% by weight of 1,2-dichloroethane from aqueous solution with concentration equal to 50 ppm, and 2% by weight of ethylene from gaseous ethylene at 1 atm and 25° C.

Example 6 s-PS Sheets Obtained from Injection Molding, with Disordered Nanoporous Crystalline Phase Syndiotactic polystyrene produced by Dow Chemical with the trademark QUESTRA 101 supplied in granule form was used. Sheets with a thickness of approximately 0.14 mm, completely amorphous, were obtained through an injection molding process, with a melt temperature equal to 310° C., an injection pressure of the melt of 800 bar, an injection time of 0.2 s and a mold temperature equal to 10° C. These amorphous containers exhibited an X-ray diffraction pattern similar to that shown in FIG. 1C.

The amorphous sheets obtained through the injection molding process were crystallized by immersion in ethyl acetate at 25° C. for at least 6 minutes and subsequent desorption through supercritical carbon dioxide treatment for 20 minutes at 200 atm and 40° C. Removal of the ethyl acetate can also take place through extraction with liquid acetonitrile for 20 min and subsequent treatment for 1 hour at 40° C. A material with ethyl acetate content of less than 0.1% by weight was obtained.

The crystallization process of the amorphous sample following absorption of ethyl acetate was clearly shown by the increase in the intensity of the infrared absorption peaks associated with vibrational modes of the helices of the crystalline phase, located at 571 and 502 $cm^{-1}$ and corresponding to a degree of crystallinity evaluated as approximately equal to 27% after removal of the ethyl acetate.

The X-ray diffraction pattern (CuKα) of the sheet, after removal of the ethyl acetate, showed broadened reflections at 2θ (CuKα) equal to 9.1° and 13.5° (FIG. 3B). In particular, the peak centered at 9.1 was characterized by a half height width equal to 2.6°.

These sheets, after reaching equilibrium followed by one minute of desorption in air, absorbed 3.3% by weight of 1,2-dichloroethane from aqueous solution with concentrations equal to 50 ppm and 2.0% by weight of ethylene from gaseous ethylene at 1 atm and 25° C.

Example 7

Preparation of s-PS Powders with Disordered Nanoporous Crystalline Phases

The amorphous powder obtained in Example 1 was crystallized through immersion in ethyl acetate at 25° C. for at least 1 minute and subsequent desorption through supercritical carbon dioxide treatment for 5 minutes at 200 atm and 40° C. A material with ethyl acetate content of less than 0.1% by weight was obtained.

The crystallization process of the amorphous sample following ethyl acetate absorption was clearly shown by the increase in the intensity of the infrared absorption peaks obtained through KBr pellets, associated with vibrational modes of the helices of the crystalline phase, located at 571 and 502 $cm^{-1}$, analogous to those shown in FIG. 2C.

In the case of the powder of the present example, the crystallization process was complete after 1 minute of immersion in ethyl acetate and corresponded to a degree of crystallinity evaluated approximately equal to 32%, after removal of the ethyl acetate.

The X-ray diffraction pattern (CuKα) of the powder, after removal of the ethyl acetate, showed broadened reflections at 2θ (CuKα) equal to 9.0° and 13.5° (FIG. 3C). In particular, the peak centered at 9.0 was characterized by a half height width equal to 2.7°.

These powders absorbed 3.3% by weight of 1,2-dichloroethane from aqueous solution with concentration equal to 50 ppm.

C. Production of Articles in s-PS in the Disordered Nanoporous Crystalline Form

Example 8

Preparation of a Coated PP Film

The amorphous powder prepared by milling, as described in example 1, was dispersed at ambient temperature for 2 hours with ethyl acetate and a resin with the trade name ACRIS R04, in turn constituted by a 40% by weight solution in ethyl acetate of polymers of acrylic and methacrylic esters. The weight ratios used between the various components to prepare the suspension were respectively equal to 50% of ethyl acetate, 33% of ACRIS R04 and 17% of syndiotactic polystyrene reduced into powder.

The dispersion thus prepared was used as composition to prepare a surface coating with a wet film thickness equal to 24 μm on an isotactic polypropylene film with thickness equal to 50 μm. The wet film was deposited on the polypropylene film using a film spreader. The surface coating obtained, following removal of the volatile dispersing medium (ethyl acetate) contained approximately 56% of s-PS in nanoporous form and 44% of binding agent.

The Fourier Transform Infrared (FTIR) absorption spectrum of the protective coating showed the presence of absorption peaks typical of the helical conformation, for example located at 571 and 502 $cm^{-1}$, typical of the nanoporous crystalline forms and not present in the initial amorphous samples, analogous to those shown in FIG. 2C.

The surface coating obtained was capable of absorbing approximately 1.2% of ethylene following absorption at atmospheric pressure of ethylene for one day and approximately 0.6% of carbon dioxide following absorption at atmospheric pressure of carbon dioxide for one day.

Example 9

Preparation of a Coated PP Film

The powder containing a disordered nanoporous crystalline phase, prepared according to the procedure described in example 7, was dispersed at ambient temperature for 2 h with water and a resin based on polyurethanes using ratios by weight equal to 50% water, 33% resin and 17% polymer, respectively.

The paint prepared was used as composition to prepare a surface coating with a wet film thickness equal to 12 μm on an isotactic polypropylene film with thickness equal to 50 μm, using a film spreader. The surface coating obtained, following removal of the volatile dispersing medium (water) contained approximately 34% of s-PS in nanoporous form and 66% binding agent.

The surface coating obtained was capable of absorbing approximately 1.2% of ethylene following absorption at atmospheric pressure of ethylene for one day and approximately 0.6% of carbon dioxide following absorption at atmospheric pressure of carbon dioxide for one day.

Example 10

Preparation of a Coated PP Film

The amorphous powder prepared by milling, as described in example 1, was dispersed at ambient temperature for 2 h with ethyl acetate containing 10% of thymol and a resin with the trade name of ACRIS R04, in turn constituted by a 40% by weight solution in ethyl acetate of polymers of acrylic and methacrylic esters. Thymol is a molecular compound with antimicrobial activity exhibiting a molecular volume equal to 0.25 $nm^3$.

The weight ratios used between the various components to prepare the suspension were respectively 45% of ethyl acetate, 33% of ACRIS R04, 17% of syndiotactic polystyrene reduced into powder and 5% of thymol.

The paint prepared was used as composition to prepare a surface coating with a wet film thickness equal to 12 μm on an isotactic polypropylene film with thickness equal to 50 μm, using a film spreader. The surface coating obtained, following removal of the volatile dispersing medium (ethyl acetate) contained approximately 62% of s-PS in co-crystalline form and 38% of binding agent.

Figure 4:
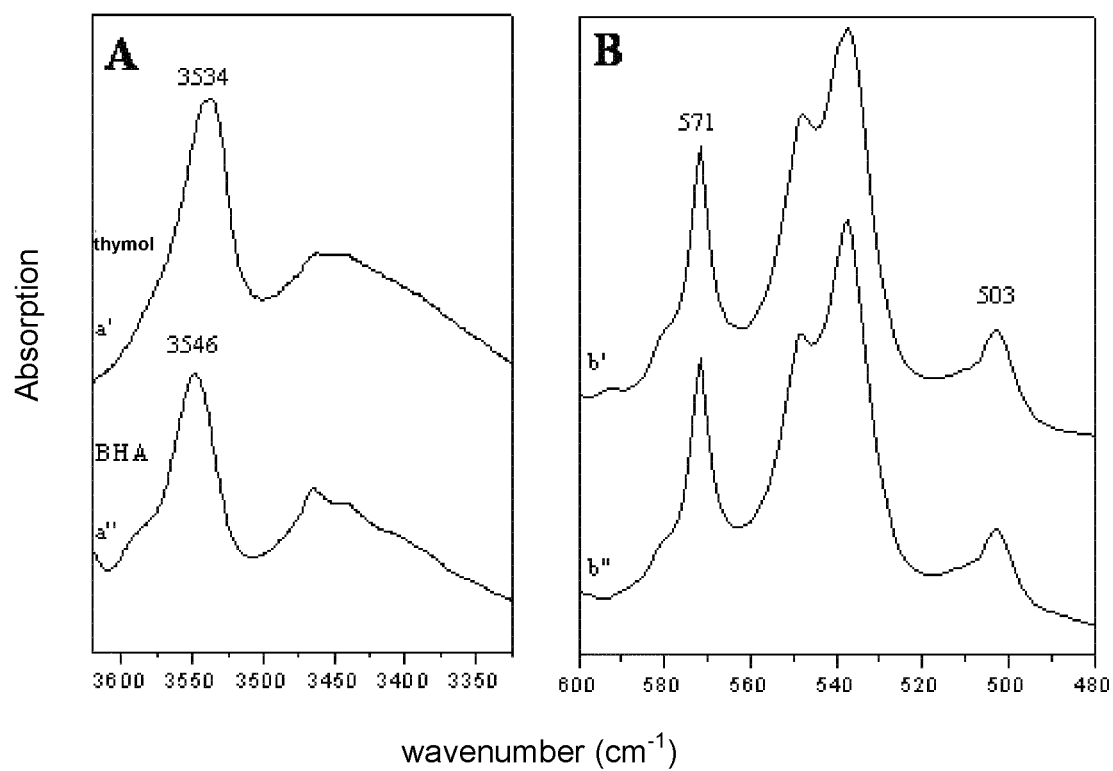
FIG. 4: Attenuated Total Reflectance (ATR) infrared spectra of the surface coating described in example 10, containing thymol as guest molecule of the disordered nanoporous crystalline phase of syndiotactic polystyrene. The spectra indicate the region between 3620 and 3325 $cm^{-1}$, where peaks typical of the thymol are present, and the region between 600 and 480 $cm^{-1}$, where peaks typical of the helices of the co-crystalline phases of syndiotactic polystyrene are present.

The Fourier Transform Infrared (FTIR) absorption spectrum of the protective coating, indicated in FIG. 4A-a' and FIG. 4B-b', clearly showed the presence of absorption peaks typical of the helical conformation, for example located at 571 and 503 $cm^{-1}$ (FIG. 4B-b'), typical of the crystalline forms and not present in the initial amorphous samples. The spectral zone between 3620 and 3325 $cm^{-1}$, showed OH stretching of the thymol (FIG. 4A-a') located at 3534 $cm^{-1}$, i.e. in a position that corresponds to thymol molecules which were guest molecules of the co-crystalline phase rather than dispersed in the amorphous phase.

Example 11

Preparation of a Coated PP Film

The amorphous powder prepared by milling, as described in example 1, was dispersed at ambient temperature for 2 h with ethyl acetate containing 8% of butylhydroxyanisole (BHA) and a resin with the trade name of ACRIS R04, in turn constituted by a 40% by weight solution in ethyl acetate of polymers of acrylic and methacrylic esters. BHA is a molecular compound with antioxidant activity with a molecular volume equal to 0.3 $nm^3$. The weight ratios used between the various components to prepare the suspension were respectively equal to 46% of ethyl acetate, 33% of ACRIS R04, 17% of syndiotactic polystyrene reduced into powder and 4% of BHA.

The paint prepared was used as composition to prepare a surface coating with a wet film thickness of 12 μm on an isotactic polypropylene film with thickness equal to 50 μm, using a film spreader. The surface coating obtained, following removal of the volatile dispersing medium (ethyl acetate) contained approximately 60% of s-PS in co-crystalline form and 40% of binding agent.

The Fourier Transform Infrared (FTIR) absorption spectrum of the protective coating, indicated in FIG. 4A-a" and FIG. 4B-b", clearly showed the presence of absorption peaks typical of the helical conformation, for example located at 571 and 503 $cm^{-1}$ (FIG. 4B-b"), typical of the nanoporous crystalline forms and not present in the initial amorphous samples. The spectral zone between 3620 and 3325 $cm^{-1}$, showed OH stretching of the BHA (FIG. 4A-a") located at 3546 $cm^{-1}$, i.e. in a position that corresponds to BHA molecules which are guest molecules of the co-crystalline phase rather than dispersed in the amorphous phase.

Example 12

The amorphous powder prepared by milling, as described in example 1, was dispersed at ambient temperature for 2 h with water and a based on polyurethanes using weight ratios equal to 50% of water, 33% of resin and 17% of polymer, respectively.

The dispersion thus prepared was used as composition to prepare a surface coating with a wet film with thickness equal to 24 μm on an isotactic polypropylene film with thickness equal to 50 μm, using a film spreader. The surface coating obtained, following removal of the volatile dispersing medium (water) contained approximately 34% of s-PS in nanoporous form and 66% of binding agent. Following removal of the volatile dispersing medium, the coating was subjected to treatment with ethyl acetate for a duration of 5 minutes.

The Fourier Transform Infrared (FTIR) absorption spectrum of the protective coating clearly showed the presence of absorption peaks typical of the helical conformation, for example located at 571 and 503 $cm^{-1}$, typical of the nanoporous crystalline forms and not present in the initial amorphous samples.

The surface coating obtained was capable of absorbing approximately 1.2% of ethylene following absorption at atmospheric pressure of ethylene for one day and approximately 0.6% of carbon dioxide following absorption at atmospheric pressure of carbon dioxide for one day.

Example 13

Injection Molding of Thick Wall Containers

Figure 5:
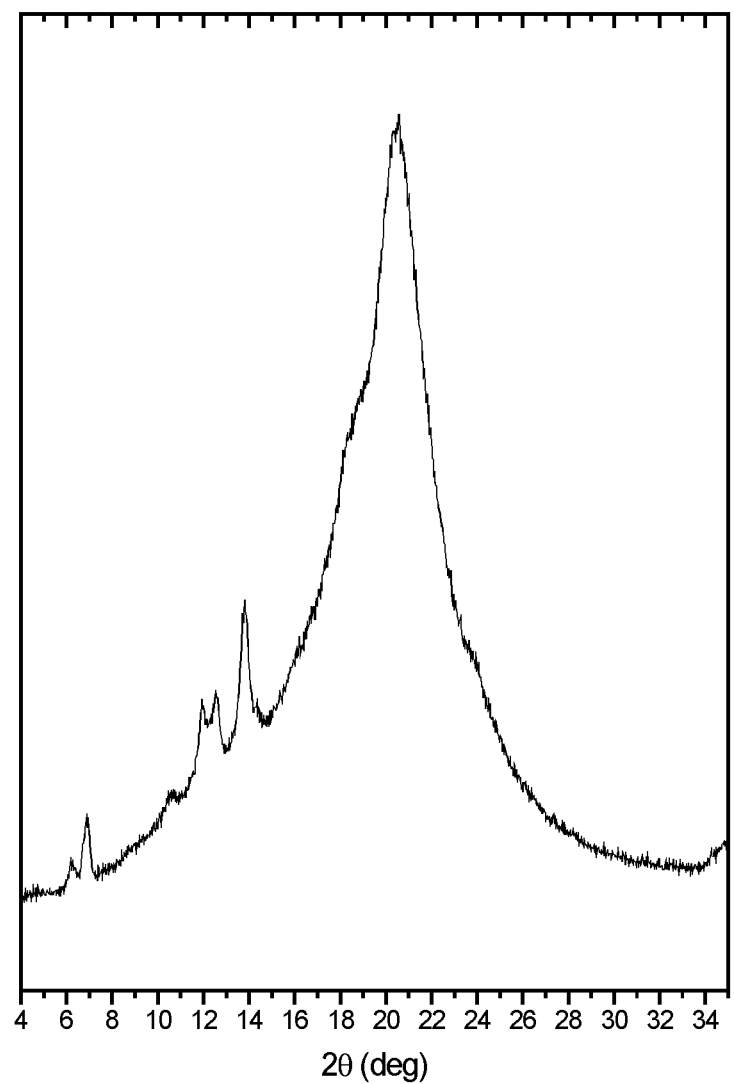
FIG. 5: X-ray diffraction spectrum (CuKα) of the thick wall container of example 13, which shows typical reflections of the crystalline phase α of s-PS.

The same syndiotactic polystyrene as example 1 was used. Parallelepiped shaped containers, open on one side, with thickness of approximately 2.0 mm, were obtained through an injection molding process, with a melt temperature of 330° C., an injection pressure of the melt equal to 800 bar, an injection time equal to 0.3 s and a mold temperature equal to 30° C. These containers were characterized by the presence of the α crystalline phase, as highlighted by the peaks at 2θ (CuKα) equal to 6.7°, 7.8°, 11.7, 13.6 and 20.4 in the X-ray diffraction pattern shown in FIG. 5. The weight fraction of this phase was approximately equal to 30%.

Figure 6:
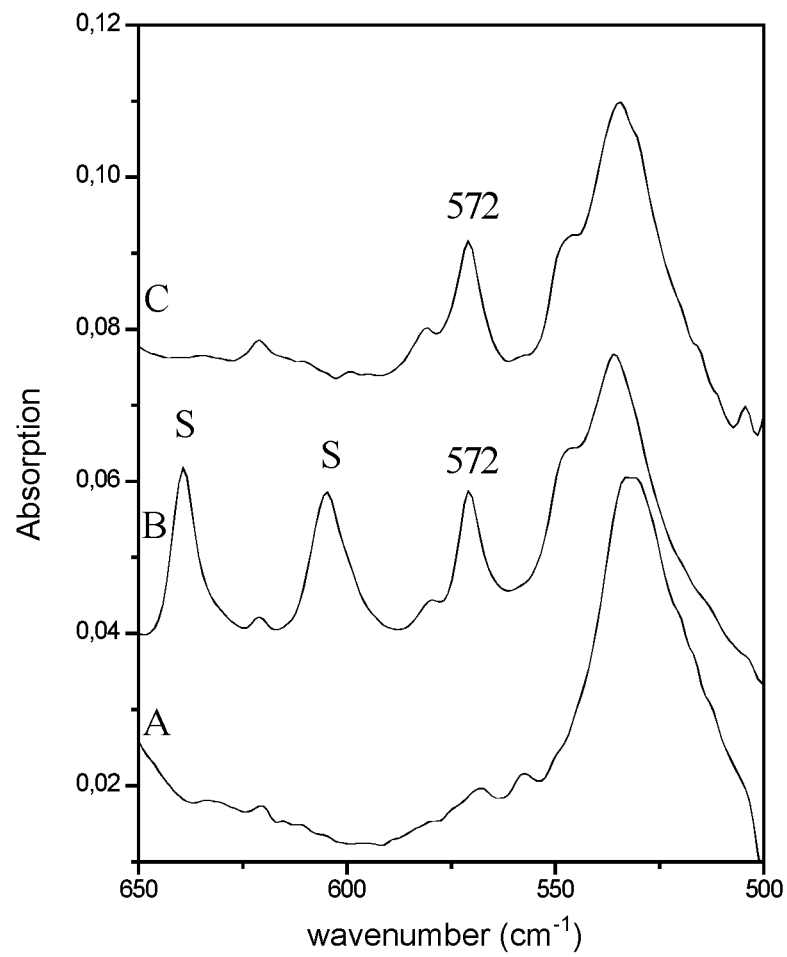
FIG. 6: Attenuated total reflectance (ATR) infrared spectra, in the region between 650 and 500 $cm^{-1}$, of the surface of the thick wall container described in example 13: A—before treatment with methyl acetate (amorphous surface layer); B—after treatment with methyl acetate; C—after removal of methyl acetate (disordered nanoporous crystalline phase)

The semi-crystalline containers obtained through the injection molding process exhibited surface areas, both on the internal and on the external surface, in which the polymer was completely amorphous, as for example highlighted by Attenuated Total Reflectance (ATR) infrared measurements (FIG. 6A).

Measurements using an optical microscope with 20x eyepiece showed that these amorphous surface areas, characterized by a greater transparency, exhibited a thickness equal to approximately 0.10 mm.

These surface thicknesses constituting the amorphous polymer were crystallized following exposure to methyl acetate vapors at 25° C. for at least 6 minutes. The crystallization process of the amorphous external surface following absorption of methyl acetate was clearly shown by the increase in the intensity of the infrared absorption peaks associated with vibrational modes of the helices of the crystalline phase, such as the peak located at 572 $cm^{-1}$ (FIG. 6B). After subsequent desorption by extraction of the methyl acetate with liquid acetonitrile for 20 min and subsequent treatment for 1 hour at 40° C., a material was obtained with ethyl acetate content of less than 0.1% by weight, with a degree of crystallinity approximately equal to 25% (FIG. 6C), constituted by s-PS in disordered nanoporous crystalline form.

Example 14

Two-Layer Coextruded Film

The same polymer as example 1 and linear low density polyethylene m-LLDPE Exceed 3598 produced by Exxon Mobil were used. Coupled films, constituted by a layer of mLLDPE with thickness of approximately 25 μm and by a layer of s-PS with thickness of approximately 15 μm, were obtained by a bubble extrusion process using a melt temperature of 190° C. for the mLLDPE and 290° C. for the s-PS. The head temperature, at the die, was set to 250° C. The bubble was obtained using a BUR (Blow up ratio) equal to 2.5 and a DR (draw ratio) equal to 8. Tie layers, based on maleic anhydride grafted polypropylene named Plexar PX 6002 by Equistar Chemicals LP, were used to improve adhesion between the layers.

Figure 7:
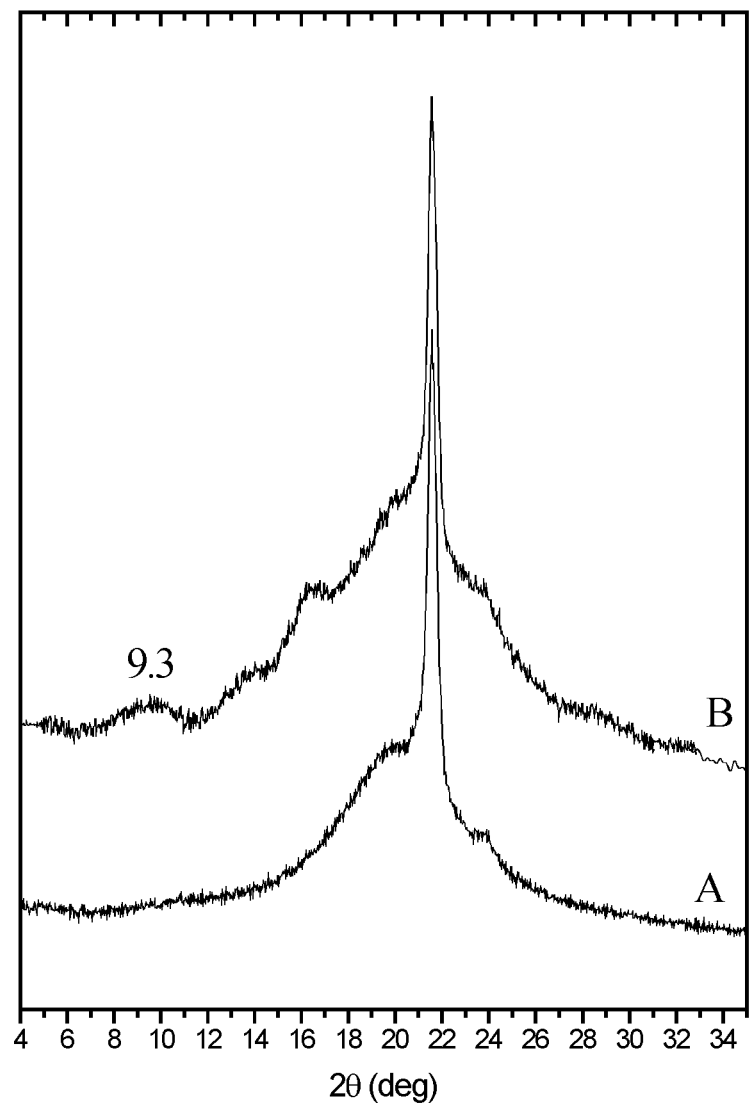
FIG. 7: X-ray diffraction spectra (CuKα) of coextruded PE/s-PS film: (A) before treatment with ethyl acetate; (B) after absorption and removal of the ethyl acetate. The presence of broadened peaks with maxima at 2θ≈9.3° and 13.7 indicates the formation of the disordered nanoporous crystalline phase.

In these two-layer films, the layer based on s-PS is completely amorphous, as highlighted by the X-ray diffraction pattern, which showed crystalline peaks of the mLLDPE superimposed on the typical amorphous halo of s-PS (FIG. 7A).

The layer based on syndiotactic polystyrene was crystallized following immersion in methyl acetate at 25° C. for at least 5 minutes and subsequent desorption at 50° C. in air for 6 hours. A film with methyl acetate content of less than 0.1% by weight was obtained.

The X-ray diffraction pattern (CuKα), after removal of the methyl acetate, showed, in addition to the PE crystalline peaks also two broadened diffraction peaks at 2θ (CuKα) equal to 9.3° and 13.7° (FIG. 7B) and therefore the layer based on s-PS exhibits the disordered nanoporous crystalline phase.

Figure 8:
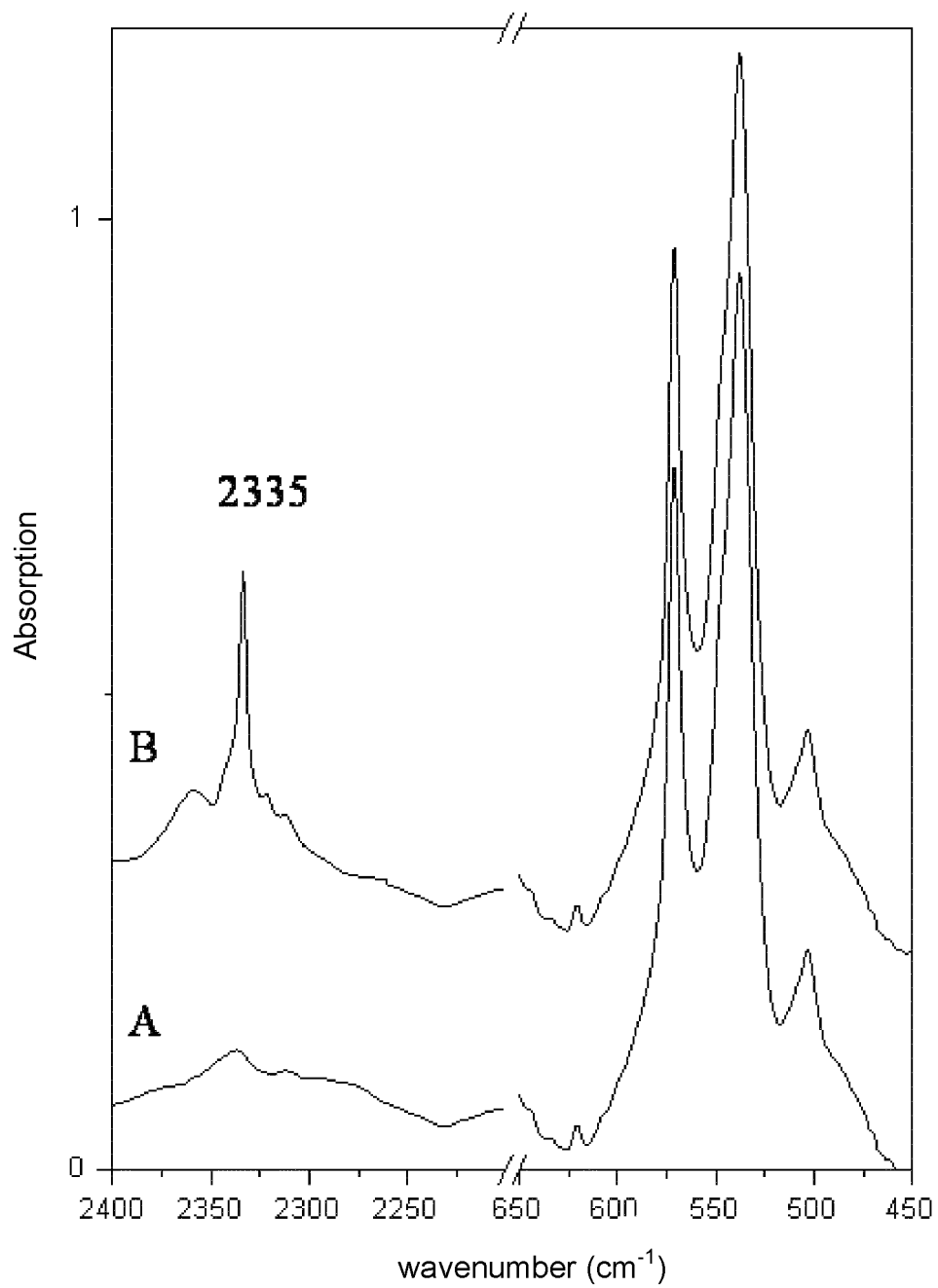
FIG. 8: Fourier Transform Infrared (FTIR) spectra, in the regions between 2400 and 2200 $cm^{-1}$ and between 650 and 450 $cm^{-1}$, of the coextruded PE/s-PS film of example 14: before (A) and after (B) absorption of carbon dioxide emitted by apples. The appearance of the peak at 2235 $cm^{-1}$ not only shows absorption of the carbon dioxide but also that the carbon dioxide molecules are incorporated as "guests" of the crystalline phase.

The two-layer PE/sPS film obtained and the PE film constituting this two-layer film were exposed for one day to the carbon dioxide emitted by apples, in a closed container. The infrared spectrum of the two-layer film after exposure to the apples exhibited carbon dioxide absorption peaks and in particular the peak at 2335 $cm^{-1}$ which highlights that the gas was entrapped in the crystalline phase (FIG. 8B). This peak was not present for the PE sample exposed to the same apples.

Example 15

Three-Layer Coextruded Films

The same syndiotactic polystyrene as example 1 and isotactic polypropylene MOPLEN PP 310 D produced by LyondellBasell were used. Three-layer films, constituted by two outer layers of i-PP with thickness of approximately 20 μm and by an inner layer of s-PS with thickness of approximately 13 μM, were obtained by a bubble extrusion process using a melt temperature of 190° C. for the PP and 290° C. for the s-PS. The head temperature, at the die, was set to 250° C. The bubble was obtained using a BUR (Blow up ratio) equal to 2.5 and a DR (draw ratio) equal to 8. Tie layers, based on maleic anhydride grafted polypropylene named Plexar PX 6002 by Equistar Chemicals LP, were used to improve adhesion between the layers.

Figure 9:
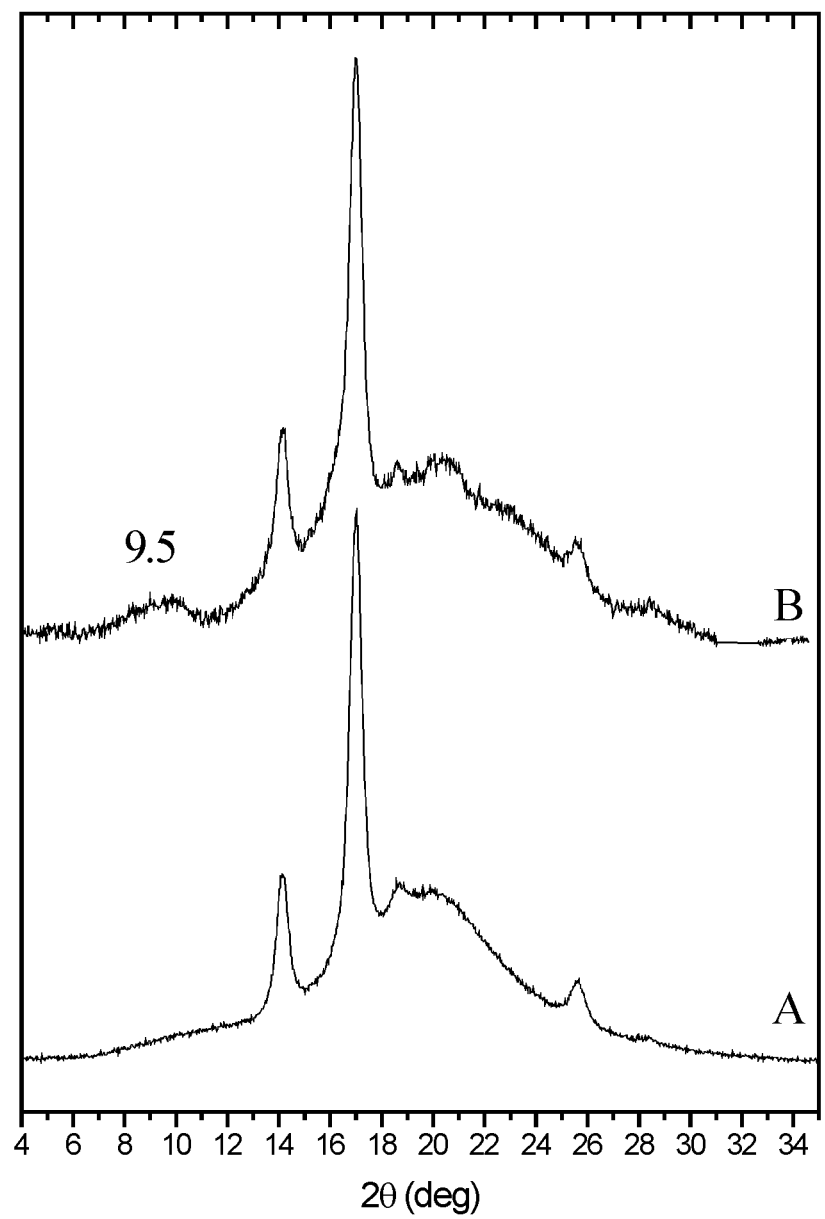
FIG. 9: X-ray diffraction spectra (CuKα) of three-layer coextruded iPP/s-PS/iPP film: (A) before treatment with ethyl acetate; (B) after absorption and removal of the ethyl acetate. The appearance of the broadened peak with maximum at 2θ≈9.5° indicates formation of the disordered nanoporous crystalline phase.

In these three-layer films, the layer based on s-PS was completely amorphous, as highlighted by the X-ray diffraction patterns, which showed crystalline peaks of the α phase of the i-PP superimposed on the typical amorphous halo of s-PS (FIG. 9A).

The layer based on syndiotactic polystyrene was crystallized following exposure to methyl acetate vapors at 25° C. for at least 2 minutes and subsequent desorption through heat treatment alone (at 50° C. for 10 hours). A film with methyl acetate content of less than 0.1% by weight was obtained. The occurrence of crystallization in helical crystalline form was easily shown by FTIR measurements analogous to those shown in FIG. 2.

The X-ray diffraction pattern (CuKα) of the multi-layer film, after removal of the ethyl acetate, showed in the region of 2θ (CuKα) less than 12°, only one broadened peak centered at approximately 9.5° (FIG. 9B), which indicated that the layer based on s-PS exhibits the disordered nanoporous crystalline phase.

Packaging tests were carried out on spinach leaves with the three-layer iPP/sPS/iPP and iPP film. The deterioration of the spinach leaves which was expressed above all in the form of dark coloring, was observed in times extended by at least 50% in the case of three-layer packaging.

Figure 10:
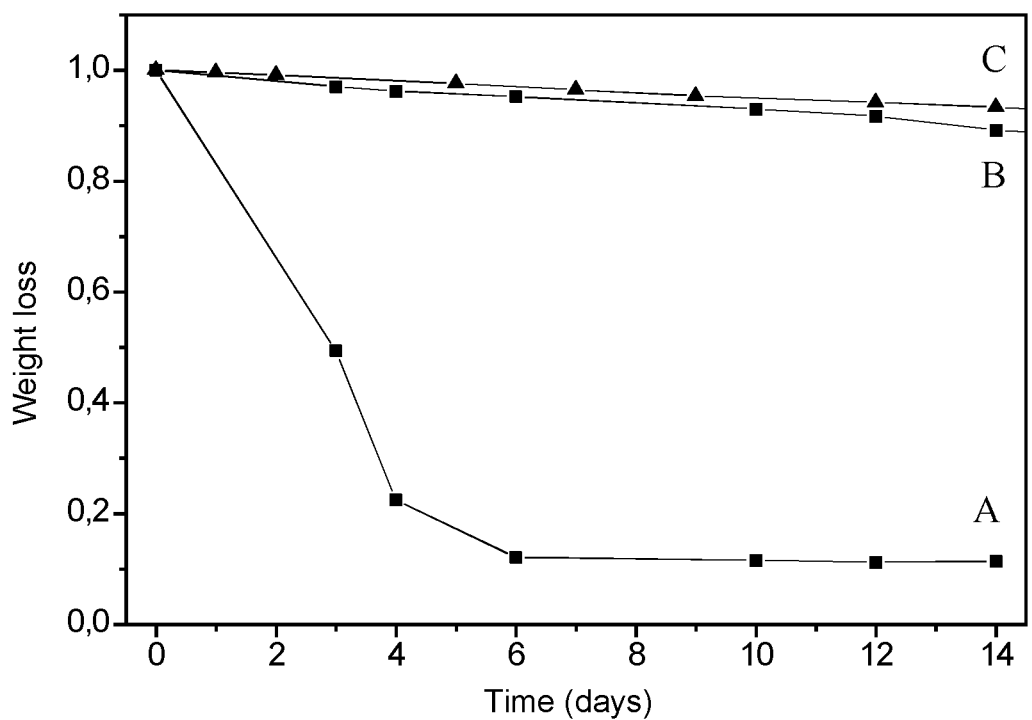
FIG. 10: percentage variation of the weight of a spinach leaf stored at 22° C. in a packaging: (A) made of s-PS with disordered nanoporous crystalline phase, (B) three-layer iPP/sPS/iPP, wherein s-PS is in disordered nanoporous crystalline phase (C) of i-PP.

The behavior of the three-layer film in the packaging was even more effective than a film based only on nanoporous s-PS. In fact, besides removing ethylene and carbon dioxide, packagings based on nanoporous s-PS caused rapid drying out of plants (FIG. 10A), as water molecules in vapor phase passed through them easily. On the contrary, the package based on the three-layer iPP/sPS/iPP film, maintained the humidity content even after several days with variations of less than 12% by weight (FIG. 10B), without the presence of degradation water in liquid form being observed in the package. FIG. 10C, for comparison, also indicates the loss by weight of the package based only on bioriented i-PP, which was even lower compared to that of the package based on the three-layer film. However, in the case of the package based on i-PP, which had a low level of water permeability, after 14 days a quantity of degradation water with a weight of at least 85% of the initial weight of the leaf was present.

Example 16

Three-Layer Coextruded Films

The same syndiotactic polystyrene as example 1 and isotactic polypropylene MOPLEN PP 310 D produced by LyondellBasell were used. Three-layer films, constituted by two outer layers of i-PP with thickness of approximately 20 μm and by an inner layer of s-PS with thickness of approximately 13 μm, were obtained by a bubble extrusion process using a melt temperature of 190° C. for the PP and 290° C. for the s-PS. The head temperature, at the die, was set to 250° C. The bubble was obtained using a BUR (Blow up ratio) equal to 2.5 and a DR (draw ratio) equal to 8. A maleic anhydride grafted polypropylene, called Plexar PX 6002 by Equistar Chemicals LP, was used to improve adhesion between the layers. This polymer was mixed by dry blending with the PP in a percentage of 5% by weight.

Example 17

Coextruded Films Containing Co-Crystalline Phases with Anethole

Figure 11:
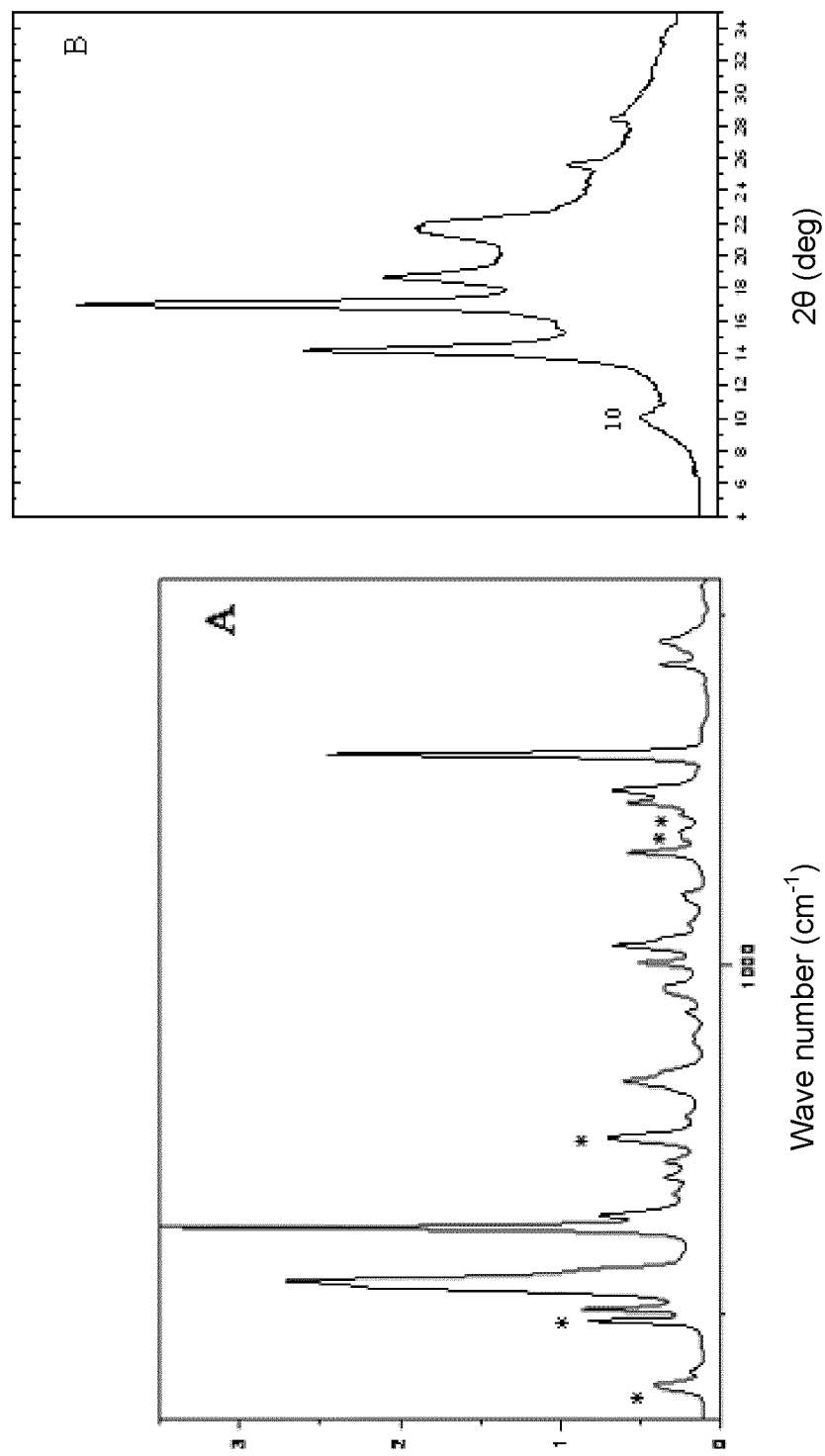
FIG. 11: three-layer coextruded iPP/sPS/iPP film of example 17, wherein s-PS is in co-crystalline crystalline phase with anethole: A—FTIR, in the region between 1700 and 400 $cm^{-1}$, (anethole peaks are indicated by asterisks); B—X-ray diffraction spectrum, in the interval at 2θ between 4° and 35° (peak of the co-crystalline phase centered at 2θ≈10°).

The three-layer coextruded film, prepared according to the procedure described in example 15, was treated with an anethole solution in acetone having a concentration of 20% by weight. After 1 hour of desorption at ambient temperature, the sample contained a quantity of anethole equal to 6% by weight, as highlighted by the typical infrared absorption peaks characteristic of anethole, indicated with an asterisk in FIG. 11A, and precisely at the positions: 1608, 1510, 1247, 819, 768 $cm^{-1}$. In FIG. 11B the X-ray diffraction spectrum of the three-layer film after anethole absorption showed the presence of the peak at 10° to indicate that the disordered nanoporous crystalline phase was transformed into a co-crystalline phase of s-PS with anethole.

The invention claimed is:
1. Syndiotactic polystyrene (s-PS) in disordered nanoporous crystalline form, characterized by an X-ray diffraction spectrum as measured by an automatic powder diffractometer, wherein at 2θ (CuKα)<15° there are present only two peaks with maxima in the intervals 8.7°<2θ (CuKα)<9.8° and 13.0°<2θ (CuKα)<13.8° and with a half height width of at least 2°.

2. Formed article comprising syndiotactic polystyrene in the disordered nanoporous crystalline form according to claim 1.

3. Formed article according to claim 2, characterized by being obtained from molten s-PS.

4. Formed article according to claim 3, characterized by being a monolayer or multilayer flexible film.

5. Formed article according to claim 2, characterized by comprising a portion of s-PS in the disordered nanoporous crystalline form.

6. Formed article according to claim 5, wherein said portion of s-PS in the disordered nanoporous crystalline form is obtained through deposition of a dispersion of s-PS on said article.

7. Amorphous syndiotactic polystyrene in powder form with grain size ≤500 μm, having an X-ray diffraction spectrum which does not contain clear peaks but only two broad halos with maximum diffraction located at diffraction angles 2θ CuKα of nearly 10° and 19.5°.

8. Process for the preparation of s-PS in disordered nanoporous crystalline form defined in claim 1, which comprises the steps of:
   a) converting the syndiotactic polystyrene from the commercially available α form into amorphous s-PS;
   b) treating said amorphous s-PS with a co-crystallizing agent and obtaining a co-crystalline form of s-PS with said co-crystallizing agent;
   c) removing said co-crystallizing agent and obtaining s-PS in disordered nanoporous crystalline form.

9. Process according to claim 8, wherein said step a) of obtaining amorphous s-PS comprises melting of the polymer at temperatures greater than 250° C. followed by quenching of the molten phase with a speed of over 50° C./min.

10. Process according to claim 8, wherein said step a) for obtaining amorphous s-PS comprises milling of α form s-PS granules to obtain a powder having a granule size ≤500 μm.

11. Process according to claim 8, wherein said co-crystallizing agent employed in said step b) for treating amorphous s-PS is a compound which must satisfy the following characteristics: A) it must not be a solvent of syndiotactic polystyrene at temperatures below 100° C.; B) it must have a molecular volume of less than 0.4 nm$^3$, where the molecular volume is defined on the basis of the formula $V_{osp}=M/(\rho N_a)$ where M and ρ are their molecular mass and density and $N_a$ is the Avogadro number; C) it must have an acid constant $pK_a>16$; D) it must have a basic constant $pK_b<10$.

12. Process according to claim 11, wherein said co-crystallizing agent is selected from ethyl acetate, methyl acetate and methyl ethyl ketone.

13. Process according to claim 11, wherein said step of treating with said co-crystallizing agent comprises contact between the co-crystallizing agent and the amorphous s-PS through immersion of the amorphous s-PS in the co-crystallizing agent in liquid form or through exposure of the amorphous s-PS to the vapors of the co-crystallizing agent so that the amorphous s-PS absorbs said co-crystallizing agent.

14. Process according to claim 13 wherein said contact by immersion or exposure takes place for a time between 2 seconds and 60 minutes.

15. Process according to claim 8, wherein said step c) of removing the co-crystallizing agent and of forming the disordered nanoporous crystalline form takes place through desorption of the co-crystallizing agent.

16. Process according to claim 15, wherein said desorption takes place through exposure to the environment with or without heating.

17. Process according to claim 15, wherein said removal takes place through removal of the organic compound by supercritical $CO_2$ treatment.

18. Process according to claim 8 wherein said s-PS in disordered nanoporous crystalline form is formed as a functionally active article, and in that said step a) of obtaining amorphous s-PS through melting is performed through injection molding of the polymer at temperatures greater than 250° C. followed by rapid quenching of the molten phase.

19. Process according to claim 8 wherein said s-PS in disordered nanoporous crystalline form is formed as a functionally active article, and in that said step a) of obtaining amorphous s-PS through melting is performed through coextrusion of the polymer at temperatures greater than 250° C. followed by rapid quenching of the molten phase.

20. Process for producing a functionally active article wherein the process comprises the deposition on at least a portion of said article of a coating layer comprising particles of syndiotactic polystyrene in amorphous form of claim 7 having an average size of less than 300 μm, said deposition taking place:
   a) in the presence of a co-crystallizing agent which is subsequently removed, or
   b) without the presence of a crystallizing agent and said coating layer comprising particles of syndiotactic polystyrene in amorphous form being placed in contact with said co-crystallizing agent after said deposition;
   said co-crystallizing agent being subsequently removed giving rise in both cases a) and b) to the formation in situ of syndiotactic polystyrene in disordered nanoporous crystalline form, said co-crystallizing agent being a compound which must satisfy the following characteristics: A) it must not be a solvent of syndiotactic polystyrene at temperatures below 100° C.; B) it must have a molecular volume of less than 0.4 nm, where the molecular volume is defined on the basis of the formula $V_{osp}=M/(\rho N_a)$ where M and ρ are their molecular mass and density and $N_a$ is the Avogadro number; C) it must have an acid constant $pK_a>16$; D) it must have a basic constant $pK_b>10$.

21. Process according to claim 20, wherein said particles of s-PS either in crystalline form or in amorphous form have an average size of less than 200 μm.

22. Process according to claim 20 wherein said particles of s-PS either in crystalline form or in amorphous form are dispersed in a dispersing medium.

23. Process according to claim 20, wherein said s-PS comprises particles with an average size of less than 150 μm.

24. Process according to claim 22, wherein said dispersing medium is selected from ethyl acetate, methyl acetate or methyl ethyl ketone.

25. Coating composition comprising particles of nanoporous syndiotactic polystyrene in disordered nanoporous crystalline form characterized by an X-ray diffraction spectrum as measured by an automatic powder diffractometer, wherein at 2θ (CuKα)<15° there are present only two peaks with maxima in the intervals 8.7°<2θ (CuKα)<9.8° and 13.0°<2θ (CuKα)<13.8° and with a half height width of at least 2° or particles of syndiotactic polystyrene in amorphous form according to claim 7, dispersed in a dispersing and non solvent liquid medium, said particles of syndiotactic polystyrene having sizes of less than 300 μm.

26. Composition according to claim 25, wherein said particles of s-PS have sizes of less than 200 μm.

27. Composition according to claim 25, wherein it comprises a binding agent and a dispersing agent.

* * * * *